(12) United States Patent
Myneni et al.

(10) Patent No.: US 10,536,350 B2
(45) Date of Patent: Jan. 14, 2020

(54) METHOD FOR DETERMINING FEATURE UTILIZATION IN A SOFTWARE-DEFINED NETWORK

(71) Applicant: NICIRA, INC., Palo Alto, CA (US)

(72) Inventors: Sirisha Myneni, Santa Clara, CA (US); Arijit Chanda, San Jose, CA (US)

(73) Assignee: VMware—Airwatch, Palo Alto—Atlanta (*) Notice: Subject to any disclaimer, the term of this patent is extended or adjusted under 35 U.S.C. 154(b) by 174 days.

(21) Appl. No.: 15/720,179

(22) Filed: Sep. 29, 2017

(65) Prior Publication Data

US 2019/0104034 A1 Apr. 4, 2019

(51) Int. Cl.
*G06F 15/16* (2006.01)
*H04L 12/24* (2006.01)
*H04L 12/26* (2006.01)

(52) U.S. Cl.
CPC ........ *H04L 41/5067* (2013.01); *H04L 41/08* (2013.01); *H04L 41/22* (2013.01); *H04L 41/5032* (2013.01); *H04L 41/5096* (2013.01); *H04L 43/062* (2013.01); *H04L 43/0876* (2013.01)

(58) Field of Classification Search
CPC .................................................. H04L 41/5032
See application file for complete search history.

(56) References Cited

U.S. PATENT DOCUMENTS

| | | | | |
|---|---|---|---|---|
| 8,219,983 | B1* | 7/2012 | Sobel | G06F 8/60 717/126 |
| 8,302,108 | B1* | 10/2012 | Hurren | G06F 8/61 709/226 |
| 9,063,818 | B1* | 6/2015 | Risbood | G06F 8/65 |
| 10,320,655 | B1* | 6/2019 | Asveren | H04L 45/123 |
| 2004/0010440 | A1* | 1/2004 | Lenard | G06F 21/105 705/59 |
| 2005/0149447 | A1* | 7/2005 | Sherkow | G06Q 10/00 705/52 |
| 2009/0089751 | A1* | 4/2009 | Raikes | G06F 9/453 717/120 |
| 2009/0113397 | A1* | 4/2009 | Wright, Sr. | G06F 21/552 717/127 |
| 2009/0138292 | A1* | 5/2009 | Dusi | G06Q 10/06 705/7.32 |

(Continued)

*Primary Examiner* — Douglas B Blair
(74) *Attorney, Agent, or Firm* — Thomas | Horstemeyer, LLP

(57) ABSTRACT

In a computer-implemented method for determining feature utilization in a software-defined network, an available feature set for the software-defined network is determined, wherein the available feature set is based on a version of the software-defined network. Features enabled on the software-defined network are determined. The features enabled in the software-defined network are compared to the available feature set. A network profile score is generated based on the comparing, where the network profile score includes constituent feature scores for features of the available feature set. The network profile score is presented in a graphical user interface, the network profile score providing an indication of feature utilization of the available feature set, where the graphical user interface allows for receiving a user interaction for presenting the constituent feature scores for the features of the available feature set responsive to the user interaction.

20 Claims, 10 Drawing Sheets

(56) References Cited

U.S. PATENT DOCUMENTS

| | | | | |
|---|---|---|---|---|
| 2009/0187823 A1* | 7/2009 | Farrell | G06F 8/71 |
| | | | 715/700 |
| 2011/0093371 A1* | 4/2011 | Clemm | G06Q 30/0207 |
| | | | 705/34 |
| 2011/0099053 A1* | 4/2011 | Irizarry, Jr. | G06Q 10/0639 |
| | | | 705/7.38 |
| 2013/0339284 A1* | 12/2013 | Rowles | G06Q 30/02 |
| | | | 706/46 |
| 2015/0312422 A1* | 10/2015 | Leemet | H04L 41/082 |
| | | | 455/406 |
| 2016/0034139 A1* | 2/2016 | Boneti | G06F 3/04817 |
| | | | 715/835 |
| 2017/0315712 A1* | 11/2017 | Curtis | H04L 67/18 |
| 2018/0232529 A1* | 8/2018 | Mahmood | G06F 21/629 |
| 2018/0321927 A1* | 11/2018 | Borthakur | G06F 8/61 |
| 2018/0337794 A1* | 11/2018 | Casaletto | H04L 12/1439 |

* cited by examiner

METHOD FOR DETERMINING FEATURE UTILIZATION IN A SOFTWARE-DEFINED NETWORK

BACKGROUND

Many types of managed and distributed systems, such as software defined networks (SDNs), provide rich and diverse feature sets for configuration and operation of the SDN. Different types of features and feature sets may be available depending on a version or type (e.g., license type) of the SDN. Moreover, new features may be added to an available feature set without a network administrator being aware of the new feature or features. Network administrators are typically tasked with ensuring that managed and distributed systems are utilizing all available and pertinent features.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1:
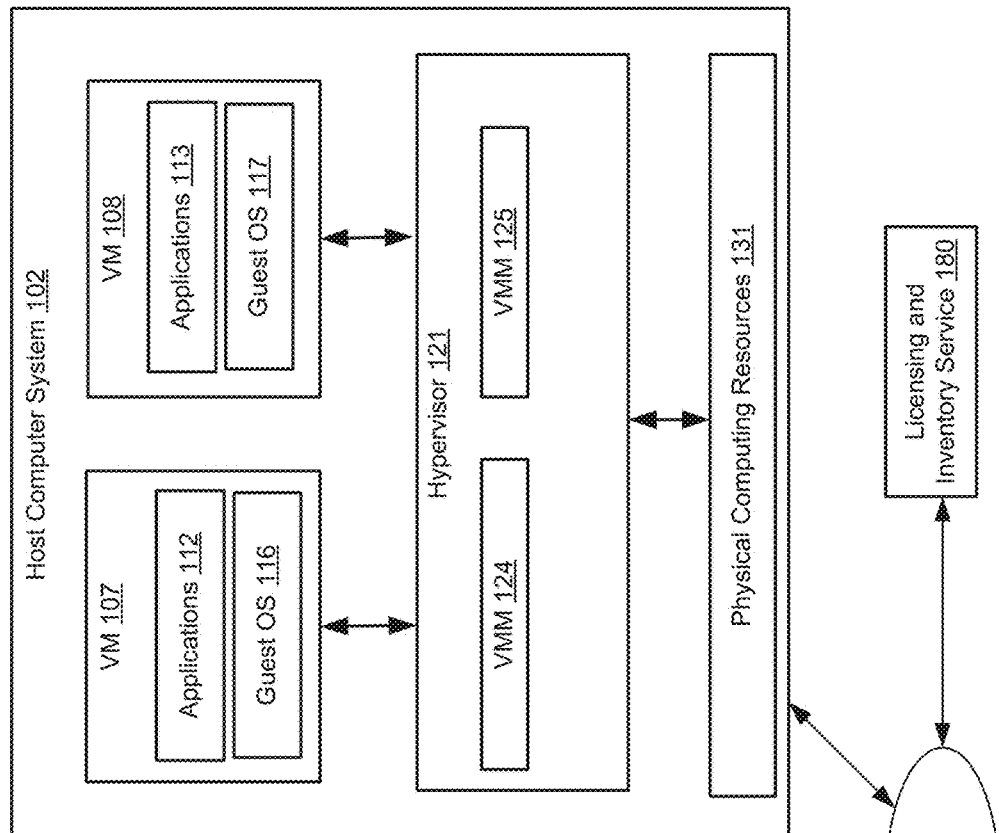
FIG. 1 shows an example software defined network (SDN) upon which embodiments of the present invention can be implemented.
Figure 1:
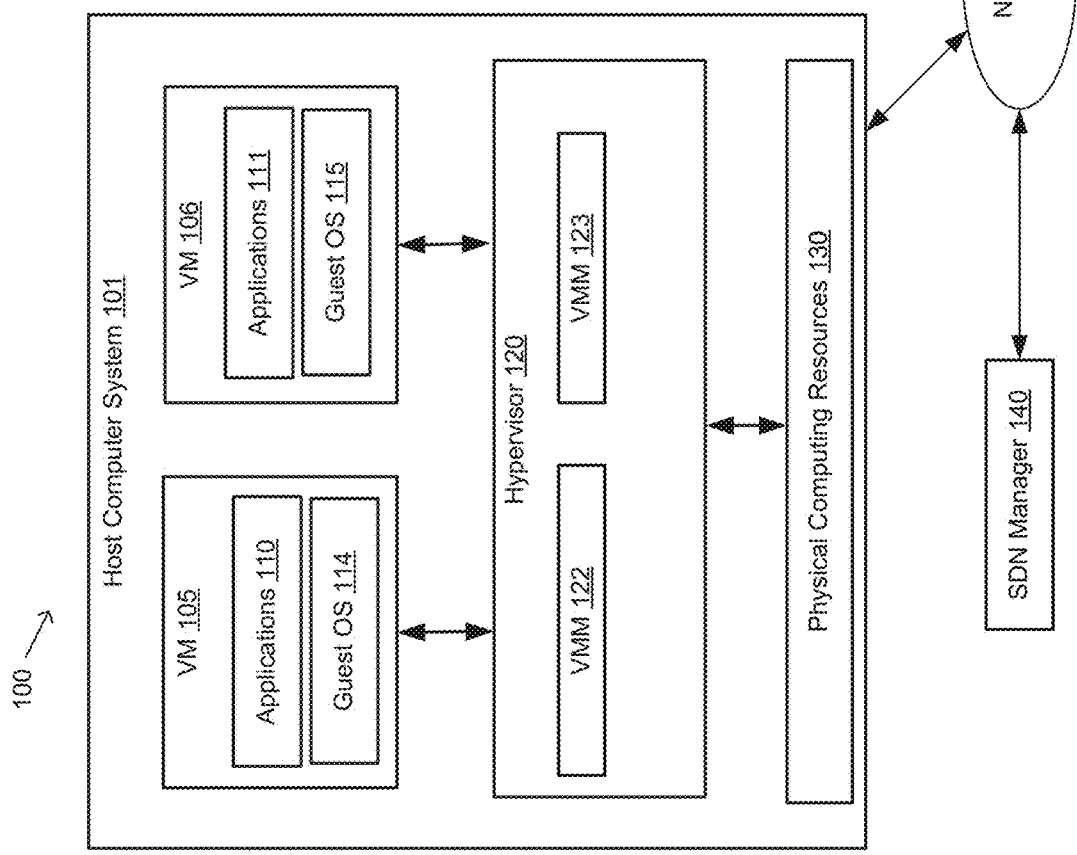

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "comparing," "generating," "presenting," "displaying," "accessing," "analyzing," "aggregating," "weighing," "receiving," "enabling," "upgrading," or the like, refer to the actions and processes of an electronic computing device or system such as: a host processor, a processor, a memory, an SDN manager, a virtualization management server or a virtual machine (VM), among others, of a virtualization infrastructure or a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Example embodiments described herein improve the security and performance of networks, such as software-defined networks. In a computer-implemented method for determining feature utilization in a software-defined network, an available feature set for the software-defined network is determined, wherein the available feature set is based on a version of the software-defined network. Features enabled on the software-defined network are determined. The features enabled in the software-defined network are compared to the available feature set. A network profile score is generated based on the comparing, where the network profile score includes constituent feature scores for features of the available feature set. The network profile score is presented in a graphical user interface, the network profile score providing an indication of feature utilization of the available feature set, where the graphical user interface allows for receiving a user interaction for presenting the constituent feature scores for the features of the available feature set responsive to the user interaction.

It should be appreciated that network administrators of managed networks (e.g., SDNs) are tasked with ensuring the performance and security of the managed networks. Managed networks provide a number of features that can be enabled for providing security and performance configurations to this end. Network administrators are often bombarded with information regarding the performance and/or security of the managed network. However, this information is often obfuscated by the sheer amount of information being presented or made available. A network administrator may not be made aware of additional features that can be enabled in the managed network that improve the security and performance of the managed network.

Embodiments described herein provide for presenting a network profile score that informs a user (e.g., a network administrator) as to the completeness of network configurations based on an available feature set relative to features that are enabled on the network. This information is useful in improving the performance of the managed network by informing a network administrator about available security and performance enhancement by enabling features that are available and not fully-enabled. For example, a network profile score can inform a user about a newly available feature in the managed network, allowing the user to enable the feature. Also, a network profile score can inform a user about features that are available in a higher version (e.g., higher license version), allowing the user to upgrade the current version of the managed network to access more security and performance features. Embodiments described herein provide a graphical user interface for presenting the network profile score, and for providing control for enabling features of the available feature set that are not enabled.

As the size and complexity of managed networks grow, so grows the management complexity of such systems. Providing information to a network administrator to enhance the performance and security of a managed network is increasingly important. Moreover, providing controls for enabling features that improve network security and performance once non-enabled features are identified improves the operation of such managed networks. Accordingly, embodiments described herein improve the performance of managed networks by identifying features that can be enabled, and by providing controls for enabling such features.

Example Datacenter and Computer System Environment

FIG. 1 shows an example physical datacenter 100 upon which embodiments of the present invention can be implemented. Software defined networking allows for virtual networking and security operations in a virtualization infrastructure. As illustrated, datacenter 100 includes host computer system 101 and host computer system 102 that are communicatively coupled to software-defined network (SDN) manager 140 via network 150. Host computer systems 101 and 102 are configured to implement logical overlay networks that are logical constructs that are decoupled from the underlying hardware network infrastructure. Logical overlay networks comprise logical ports, logical switches, logical routers, etc. Each logical overlay network is decoupled from the physical underlying infrastructure by encapsulation of overlay network packets, e.g., using an encapsulation protocol such as VXLAN or Geneve, before transmitting the data packet over physical network 150.

While datacenter 100 is illustrated with two host computer systems, each implementing two virtual machines, it should be appreciated that embodiments described herein may utilize any number of host computer systems implementing any number of virtual machines. Moreover, while embodiments of the present invention are described within the context of datacenter for implementing a virtualization infrastructure, it should be appreciated that embodiments of the present invention may be implemented within any managed system including data objects.

Virtualized computer systems are implemented in host computer systems 101 includes physical computing resources 130 and host computer system 102 includes physical computing resources 131. In one embodiment, host computer systems 101 and 102 are constructed on a conventional, typically server-class, hardware platform.

In accordance with various embodiments, physical computing resources 130 and 131 include one or more central processing units (CPUs), system memory, and storage. Physical computing resources 130 and 131 may also include one or more network interface controllers (NICs) that connect host computer systems 101 and 102 to network 150.

Hypervisor 120 is installed on physical computing resources 130 and hypervisor 121 is installed on physical computing resources 131. Hypervisors 120 and 121 support a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware for virtual machine 105 supports the installation of guest OS 114 which is capable of executing applications 110 within virtual machine 105. Similarly, virtual machine 106 supports the installation of guest OS 115 which is capable of executing applications 111 within virtual machine 106, virtual machine 107 supports the installation of guest OS 116 which is capable of executing applications 112 within virtual machine 107, and virtual machine 108 supports the installation of guest OS 117 which is capable of executing applications 113 within virtual machine 108.

In an alternate embodiment (not shown) some or all of applications 110-113 reside in namespace containers implemented by a bare-metal operating system or an operating system residing in a virtual machine. Each namespace container provides an isolated execution space for containerized applications, such as Docker® containers, each of which may have its own unique IP and MAC address that is accessible via a logical overlay network implemented by underlying hypervisor if it exists or by the host operating system.

Virtual machine monitors (VMM) 122 and 123 may be considered separate virtualization components between the virtual machines and hypervisor 120 since there exists a separate VMM for each instantiated VM. Similarly, VMM 124 and VMM 125 are separate virtualization components between the virtual machines and hypervisor 121. Alternatively, each VMM may be considered to be a component of its corresponding virtual machine since such VMM includes the emulation software for virtual hardware components, such as I/O devices, memory, and virtual processors, for the virtual machine, and maintains the state of these virtual hardware components. It should also be recognized that the techniques described herein are also applicable to hosted virtualized computer systems.

In various embodiments, SDN manager 140 provides control for logical networking services such as a logical firewall, logical load balancing, logical layer 3 routing, and logical switching. In some embodiments, SDN manager 140 is able to create and manage data objects of a logical overlay network, such as logical routers. Logical network services may be allocated associated resources that are necessary for performing the services' respective operations. For example, logical routers may be allocated resources such as IP addresses and MAC addresses. To ensure proper configuration and operation of a logical network, these allocated resources typically must be unique.

In accordance with various embodiments, workloads are communicated over a logical overlay network. Examples of a workload, as used herein, include an application, a virtual machine, or a container, etc. For example, a workload may include implementing a web server, implementing a web server farm, implementing a multilayer application, etc.

In various embodiments, datacenter 100 also includes licensing and inventory service 180 that is communicatively coupled to host computer system 101, host computer system 102, and software-defined network (SDN) manager 140 via network 150. Licensing and inventory service 180 stores license version information for an SDN that is operating on datacenter 100. The license version information includes an indication of available features for the license version. For example, an SDN may have multiple associated versions (e.g., a standard license version, an advanced license version, and an enterprise license version), where each version has different available feature sets. In some embodiments, a version (e.g., a lower version) may include a subset of features of another version (e.g., a higher version). In other embodiments, different versions of the SDN may include overlapping subsets of features, where some features are only available in one respective version. It should be appreciated that an SDN can have any number of versions, and is not limited to the described embodiments.

In some embodiments, licensing and inventory service 180 provides an application programming interface (API) for accessing licensing and feature enablement information. Licensing and inventory service 180 stores information related to a license version of an SDN operating on datacenter 100. In some embodiments, licensing and inventory service 180 also includes information related to the enablement of at least some features of the SDN version on datacenter 100. The information stored on licensing and inventory service 180 regarding a license version and enabled features is also referred to herein as telemetry data. For example, as will be described below, licensing and inventory service 180 includes information indicating whether a load balancing feature is enabled on datacenter 100. The API of licensing and inventory service 180 allows a user (e.g., network administrator) to access the version of the SDN and/or information related to enabled features of the SDN. It should be appreciated that for some features, licensing and inventory service 180 does not include enablement information.

In various embodiments, a logical overlay network, using at least one of hypervisor 120 and 121, may include Layer 2 through Layer 7 networking services (e.g., switching, routing, access control, firewalling, quality of service (QoS), and load balancing) whose configuration and/or state may be represented by data objects. Accordingly, these data objects may be assembled and/or manipulated (e.g., by a networking administrator programmatically, via a graphical user interface, command line interface, etc.) in any combination, to produce individual logical overlay networks. As previously mentioned, logical overlay networks are independent of underlying network hardware (e.g., physical computing resources 130 and 131), allowing for network hardware to be treated as a networking resource pool that can be allocated and repurposed as needed.

Logical switches and logical routers are examples of services that may be represented by data objects for resource allocation. A logical switch creates a logical broadcast domain or segment to which an application or tenant VM can be logically wired. A logical switch may provide the characteristics of a physical switch's broadcast domain. In some embodiments, a logical switch is distributed and can span arbitrarily large compute clusters. For example, logical overlay network allows a VM to migrate within its datacenter without limitations of the physical Layer 2 boundary. A logical router provides the necessary forwarding information between logical Layer 2 broadcast domains.

Figure 2:
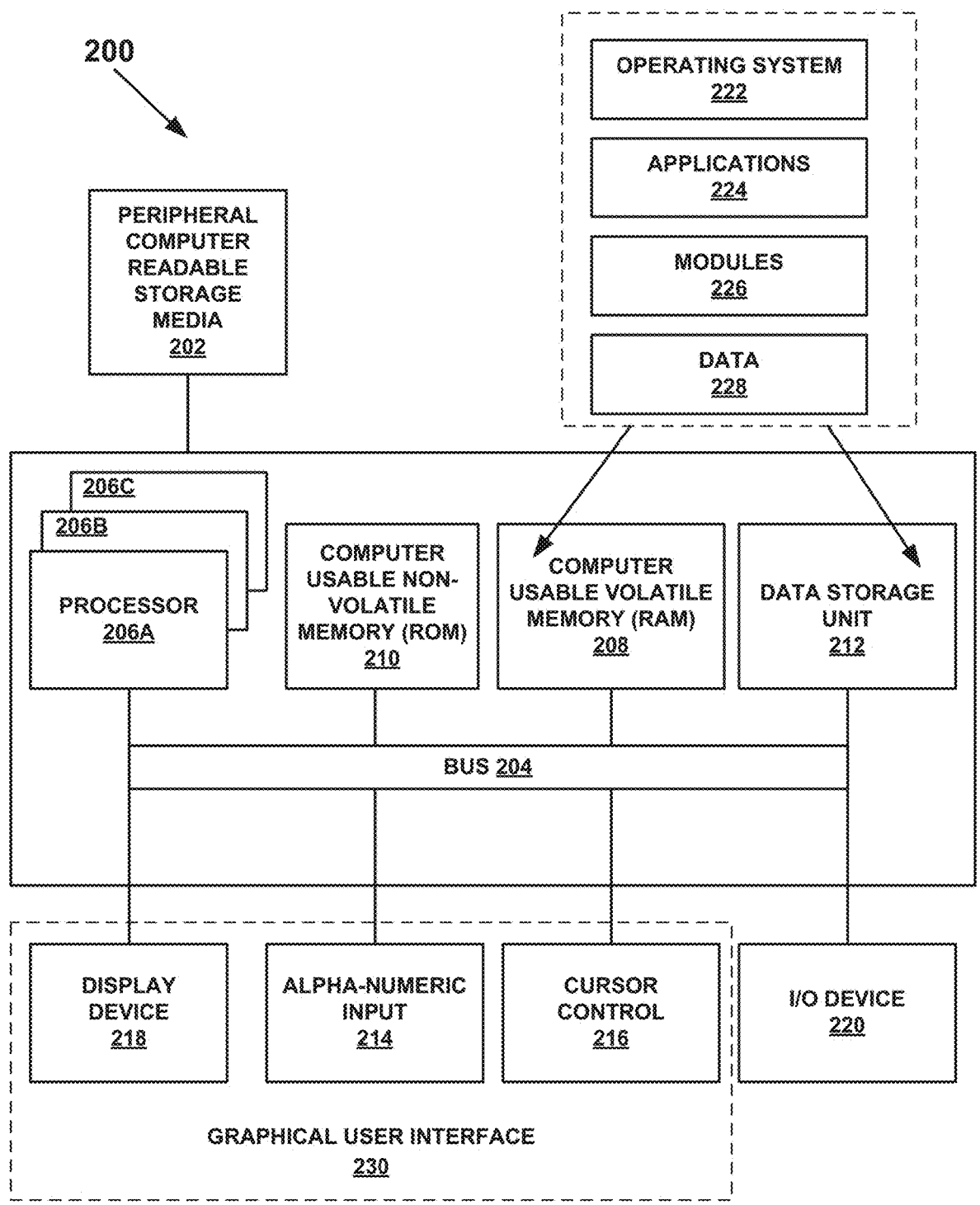
FIG. 2 shows an example computer system including a graphical user interface (GUI), in accordance with various embodiments.

With reference now to FIG. 2, all or portions of some embodiments described herein are composed of computer-readable and computer-executable instructions that reside, for example, in computer-usable/computer-readable storage media of a computer system. That is, FIG. 2 illustrates one example of a type of computer (computer system 200) that can be used in accordance with or to implement various embodiments which are discussed herein. It is appreciated that computer system 200 of FIG. 2 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, media centers, handheld computer systems, multi-media devices, datacenters, virtual machines, virtualization infrastructures, virtualization management servers, and the like. Computer system 200 of FIG. 2 is well adapted to having peripheral tangible computer-readable storage media 202 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature. It should be appreciated that SDN manager 140 of FIG. 1 may include or be implemented within a computer system 200.

System 200 of FIG. 2 includes an address/data bus 204 for communicating information, and a processor 206A coupled with bus 204 for processing information and instructions. As depicted in FIG. 2, system 200 is also well suited to a multi-processor environment in which a plurality of processors 206A, 206B, and 206C are present. Conversely, system 200 is also well suited to having a single processor such as, for example, processor 206A. Processors 206A, 206B, and 206C may be any of various types of microprocessors. System 200 also includes data storage features such as a computer usable volatile memory 208, e.g., random access memory (RAM), coupled with bus 204 for storing information and instructions for processors 206A, 206B, and 206C. System 200 also includes computer usable non-volatile memory 210, e.g., read only memory (ROM), coupled with bus 204 for storing static information and instructions for processors 206A, 206B, and 206C. Also present in system 200 is a data storage unit 212 (e.g., a magnetic or optical disc and disc drive) coupled with bus 204 for storing information and instructions. System 200 also includes an alphanumeric input device 214 including alphanumeric and function keys coupled with bus 204 for communicating information and command selections to processor 206A or processors 206A, 206B, and 206C. System 200 also includes an cursor control device 216 coupled with bus 204 for communicating user input information and command selections to processor 206A or processors 206A, 206B, and 206C. In one embodiment, system 200 also includes a display device 218 coupled with bus 204 for displaying information.

Referring still to FIG. 2, display device 218 of FIG. 2 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 216 allows the computer user to dynamically signal the movement of a visible symbol (cursor) on a display screen of display device 218 and indicate user selections of selectable items displayed on display device 218. Many implementations of cursor control device 216 are known in the art including a trackball, mouse, touch pad, touch screen, joystick or special keys on alphanumeric input device 214 capable of signaling movement of a given direction or manner of displacement. Alternatively, it will be appreciated that a cursor can be directed and/or activated via input from alphanumeric input device 214 using special keys and key sequence commands. System 200 is also well suited to having a cursor directed by other means such as, for example, voice commands. In various embodiments, alphanumeric input device 214, cursor control device 216, and display device 218, or any combination thereof (e.g., user interface selection devices), may collectively operate to provide a graphical user interface (GUI) 230 under the direction of a processor (e.g., processor 206A or processors 206A, 206B, and 206C). GUI 230 allows user to interact with system 200 through graphical representations presented on display device 218 by interacting with alpha-numeric input device 214 and/or cursor control device 216.

System 200 also includes an I/O device 220 for coupling system 200 with external entities. For example, in one embodiment, I/O device 220 is a modem for enabling wired or wireless communications between system 200 and an external network such as, but not limited to, the Internet.

Referring still to FIG. 2, various other components are depicted for system 200. Specifically, when present, an operating system 222, applications 224, modules 226, and data 228 are shown as typically residing in one or some combination of computer usable volatile memory 208 (e.g., RAM), computer usable non-volatile memory 210 (e.g., ROM), and data storage unit 212. In some embodiments, all or portions of various embodiments described herein are stored, for example, as an application 224 and/or module 226 in memory locations within RAM 208, computer-readable storage media within data storage unit 212, peripheral computer-readable storage media 202, and/or other tangible computer-readable storage media.

Figure 3:
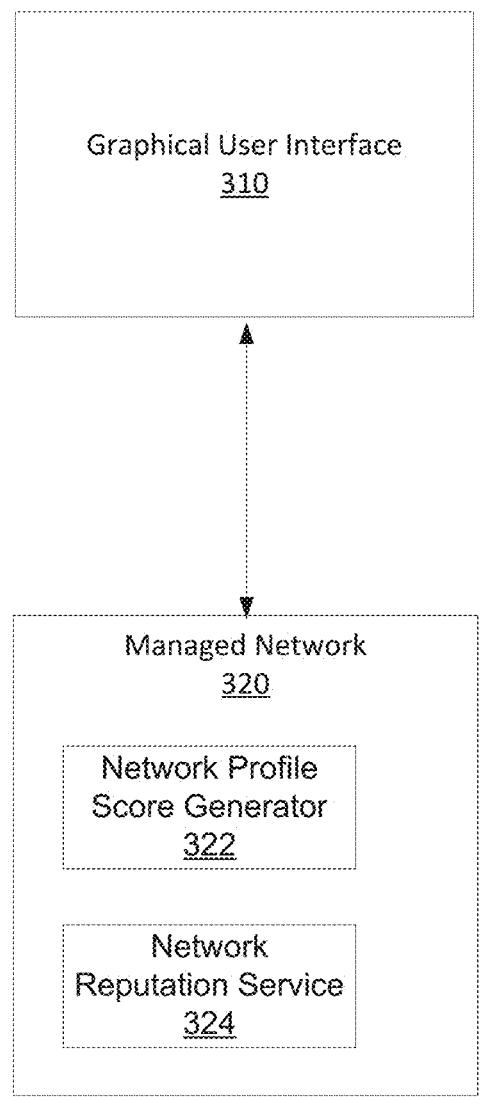
FIG. 3 shows an example managed network and graphical user interface, in accordance with various embodiments.

Example embodiments described herein provide a graphical user interface 310 for dynamically presenting status information of a managed network 320 (e.g., an SDN). With reference now to FIG. 3, an example managed network 320 and graphical user interface 310 are shown, in accordance with various embodiments. It should be appreciated that that managed network 320 can be any type of network that is provides multiple configurable features, such an SDN, virtualized infrastructures, enterprise networks, management information systems, etc. In some embodiments, graphical user interface 310 is presented via a computer system 200. In some embodiments, graphical user interface 310 is presented via at least one of SDN manager 140, and host computer system 101 and 102. It should be appreciated that a network profile score can be generated for any type of managed network, such as an SDN (such as VMware's NSX), that provides a number of features that can be enabled for providing various types of functionality.

In one embodiment, managed network 320 includes network profile score generator 322. It should be appreciated that the operations of network profile score generator 322 might be distributed across managed network 320, or might be performed by multiple components or monitors of managed network 320. For purposes of simplicity, network profile score generator 322 refers to the functions associated with accessing and collecting enablement information for features of managed network, including accessing the features directly and/or accessing a central information repository including enablement information. In one embodiment, managed network 320 includes network reputation service 324.

In one embodiment, managed network 320 is an SDN. An SDN provides for programmatic control of virtual networking services, such as a logical firewall, logical load balancing, logical layer 3 routing, and logical switching. An SDN may provide a number of different features, where different versions of the SDN may include further combinations of different available features.

Network Profile Score

In accordance with the described embodiments, a managed network, such as an SDN, provides a number of features that can be enabled for providing various types of functionality. For example, an SDN (such as VMware's NSX) may provide features aimed at different use cases such as micro-segmentation, application continuity, and cloud development. In a conventional SDN, there is no mechanism informing a network administrator as to completeness of network configurations for an available feature set. Embodiments described herein provide for presenting a network profile score that informs a user (e.g., a network administrator) as to the completeness of network configurations based on an available feature set relative to features that are enabled on the network. In accordance with various embodiments, the network profile score can be generated at a network profile score generator 322 operating at an SDN manager (e.g., SDN manager 140), a host computer system (e.g., host computer systems 101 and 102), a managed network (managed network 320), or any combination thereof.

Embodiments herein describe a network profile score which provides a feedback to the administrator about the completeness of the network configurations based on the feature sets enabled. This information is useful in ensuring that the administrator is fully enabling available features, and can be used to diagnose and/or isolate network configuration concerns. The network profile score also provides an insight to the administrator about the features the network is entitled to enable based on a version of an SDN. For example, the differences between a purchased license (e.g., license stock keeping unit (SKU)) and the additional benefits available if a higher license (e.g., higher SKU) is acquired. The network profile score provides a user with information used in 1) ensuring that all available and relevant features are enabled, 2) informing of newly available features (e.g., via an update or upgrade to the version), or 3) informing a user of additional features that are available in different versions.

In one embodiment, a network profile score is presented in a dashboard as two separate scores, an Entitled Score and a Projected Score, where the Entitled Score is based on the feature sets available by the current license and Projected Score is based on the features sets that could be enabled by upgrading to a higher license version.

In determining the network profile score, embodiments described herein determine an available feature set for the software-defined network, where the available feature set is based on a version of the software-defined network, and determine the features enabled on the software-defined network.

An available feature set for the SDN is determined, where the available feature set is based on a version of the SDN (e.g., license version). In one embodiment, the version of the SDN is accessed from licensing and inventory service 180. In one embodiment, a licensing capacity usage API for licensing and inventory service 180 provides for the querying usage and licensing of an SDN for a datacenter. For example, for VMware's NSX, the licensing capacity usage API provides reports on usage of CPUs and virtual machines. Example APIs of the licensing capacity usage API include functions in the code returning the license type and expiry time (getExpiry( ),getEdition( ))

An SDN includes multiple features that may be enabled to provide services for network configuration. Examples of these features include, without limitation: network virtualization (NV), anti-virus (AV), distributed firewall (DFW), identity firewall (IDFW), load balancing, (LB), virtual private network (VPN), network extensibility program (NetX), endpoint monitoring, network address translation (NAT), Virtual Extensible Local Area Network (VXLAN), and multi-site virtualization (e.g., VMware's Multi-VC). It should be appreciated that some features are universal (e.g., can be enabled for the complete SDN) or are workload or host-specific (e.g., feature can be selectively enabled in some hosts or workloads of the SDN).

Enabled features for the SDN are then determined. Determining whether a feature is enabled depends on the type of feature. For instance, whether a universal feature is enabled may be determined by accessing licensing and inventory service 180 (e.g., via an API of licensing and inventory service 180). Enablement of other features is determined via the network fabric (e.g., via a network fabric API) and/or via direct query of installed features (e.g., via a feature API).

For example, for VMware's NSX, the licensing capacity usage API provides reports on usage of CPUs and virtual machines. An example API of the licensing capacity usage API includes:

CPU and VM capacity usage: api/2.0/services/licensing/capacityusage

Fabric related APIs can be used to query information about the feature set and the status of the feature set (e.g., whether a feature of the feature set is enabled). Example fabric related APIs include:

/api/2.0/nwfabric/features
/api/2.0/nwfabric/status?resource=resourceId
/api/2.0/nwfabric/status/child/parentresourceId
Edge Configuration: /api/4.0/edges/edgeId/firewall/config Installed features can be accessed directly via their own APIs to query information about the particular feature (e.g., whether the feature is enabled). Example feature related APIs include:

Service Insertion: /api/2.0/si/deploy/cluster/clusterId
DFW: /api/2.0/services/policy/securitypolicy/
Endpoint Security: /api/2.0/endpointsecurity/registration/vendorId
Load Balancing: /api/4.0/edges/edgeId/loadbalancer/config
Multi-VC or Cross-VC: /api/2.0/universalsync/configuration/role
Spoof Guard: /api/4.0/services/spoofguard/policies/policyId
Service Composer: /api/4.0/firewall/globalroot-0/config
IDFW: /api/3.0/ai/userdetails
Endpoint Monitoring: /api/internal/appmon/currentsession The network profile score is determined by aggregating the constituent features scores for available features of the SDN. For example, Table 1 illustrates and example scoring criteria for constituent feature scores of an example SDN. The SDN of Table 1 includes nine features, each scored on a basis of zero (0) to ten (10) points, for a total possible score of ninety (90) points.

TABLE 1

| Feature Name | Scoring Criteria |
| --- | --- |
| Edge (10) | Feature Enabled: 10 Feature: Not Enabled: 0 |
| Load Balancer (10) | Feature Enabled: 10 Feature: Not Enabled: 0 |
| IDFW (10) | Feature Enabled: 10 Feature: Not Enabled: 0 |
| Network Virtualization (VXLAN) (10) | (Number of clusters with VXLAN Enabled/Total Clusters)*10 |
| Firewall (10) | (Num of clusters with Firewall Enabled/Total Clusters)*10 |
| Endpoint Monitoring (10 | Feature Enabled: 10 Feature: Not Enabled: 0 |
| Distributed Firewall (10) | Feature Enabled: 10 Feature: Not Enabled: 0 |
| Security Policies (10) | Feature Enabled: 10 Feature: Not Enabled: 0 |
| Cross-VC (10) | Manager set in replication mode: 10, Standalone mode: 0 |

In the current example, the constituent feature scores are calculated separately. In accordance with the various described embodiments, the data used to determine a constituent feature score may be obtained by accessing various APIs, such as an inventory and licensing API, a network fabric API, and/or a feature API.

Edge Configuration Score (Max Score: 10)

The enablement of the edge configuration may be determined by accessing data via the network fabric API. In one embodiment, the score is a Boolean value, where the score is zero points if edge configuration is not enabled and the score is ten points if edge configuration is enabled. In one example, enablement is determined if any of the following values returned via the API are greater than zero:

NsxEdgeCountWithECMPEnabled: 0
NSX Edge (distributedRouter) Count: 0
VCNS Edge Count: 0
Edge_NSX_Firewall Count: 0
Edge_NSX_SSLVPN Count: 0
getAllRouteLifsCount: 0
Edge_NSX_NAT Count: 0
Edge_NSX_DHCP Count: 0
NsxEdgeCountWithBGPEnabled: 0
NSX Edge (gatewayServices) Count: 0
Edge_NSX_IPSEC_VPN Count: 0
Edge_NSX_L2VPN Count: 0
Edge_NSX_HA Count: 0
NsxEdgeCountWithOSPFEnabled: 0

Load Balancer Score (Max Score: 10)

The enablement of the load balancer may be determined by accessing data via the load balancer API. In one embodiment, the score is a Boolean value, where the score is zero points if load balancing is not enabled and the score is ten points if load balancing is enabled. In one example, enablement is determined if any of the following values returned via the API are greater than zero:

getAllVirtualServersCount: 0
getAllPoolsCount: 0
getAllServiceMonitorsCount: 0
getAllPoolMembersCount: 0

Identity Firewall (IDFW) Score (Max Score: 10)

The enablement of the IDFW may be determined by accessing data via the IDFW API. In one embodiment, the score is a Boolean value, where the score is zero points if IDFW is not enabled and the score is ten points if IDFW is enabled. In one example, enablement is determined based on the active directory (AD) domains configured by a user (e.g., network administrator). Enablement is determined if any of the following values are greater than zero:

getDomainsCountByTypeAndMethod: 0

Endpoint Monitoring Score (Max Score: 10)

The enablement of the endpoint monitoring may be determined by accessing data via the endpoint monitoring API. In one embodiment, the score is a Boolean value, where the score is zero points if endpoint monitoring is not enabled and the score is ten points if endpoint monitoring is enabled. In one example, enablement is determined based on whether a current session for monitoring is not null, indicating that there is an active session monitoring the virtual machines in a security group. In one example, if a current session is not null, the endpoint monitoring score is set to ten, otherwise it is set to zero.

Network Virtualization (VXLAN) Score (Max Score: 10)

The enablement of network virtualization may be determined by accessing data via the licensing and inventory service 180 (e.g., telemetry data) API. In one embodiment, the score is a relative value identifying a degree to which the network virtualization feature is enabled, where the score is zero points if network virtualization is not enabled, the score is ten points if network virtualization is fully enabled, and the score is in the range between zero through ten points depending on the extent of the network virtualization enablement. In one example, a score for network virtualization is calculated based the clusters and hosts within the cluster prepped for VXLAN. In an example, the max score for this feature is set to ten. In one embodiment, enablement is determined according to:

$$vxlanScore = (\text{Number of hosts within a cluster prepped}/total\_hosts)*10$$

For example, if there are two clusters, one of which is prepped for VXLAN with ten hosts, and the other cluster with ten hosts not prepped for VXLAN, the overall score for this feature is five (5) (e.g., (10/20)*10=5). Similarly if there are three hosts out of ten prepped for VXLAN, score is three (3) (e.g., (3/10)*10=3).

Firewall Score (Max Score: 10)

The enablement of a firewall may be determined by accessing data via the licensing and inventory service 180 (e.g., telemetry data) API. In one embodiment, the score is a relative value identifying a degree to which the firewall feature is enabled, where the score is zero points if firewall is not enabled, the score is ten points if firewall is fully enabled, and the score is in the range between zero through ten points depending on the extent of the firewall enablement. In one example, a score for firewall is calculated based the clusters and hosts within the cluster prepped for firewall. In an example, the max score for this feature is set to ten. In one embodiment, enablement is determined according to:

firewallScore=(number of hosts in the clusters prepped for vxlan/total_hosts)*10

For example, if there are two clusters, one of which is prepped for firewall with ten hosts, and the other cluster with one-hundred hosts not prepped for firewall, the overall score for this feature is 0.9 (e.g., (10/110)*10=0.9). Similarly if the cluster having one-hundred hosts is prepped for firewall and that cluster with ten hosts is not prepped for firewall, the overall score for this feature is nine (9) (e.g., (100/110)*10=9).

Security Policies Score (Max Score: 10)

The enablement of the security policies may be determined by accessing data via the security policies API. In one embodiment, the score is a Boolean value, where the score is zero points if security policies are not enabled and the score is ten points if security policies are enabled. In one example, enablement is determined based on whether any of the security grouping tagging/policies are used. In some embodiments, the score includes usage ippools and Service Insertion. Enablement is determined if any of the following values are greater than zero:

getAllIPSetsCount: 0
getAllSecurityTagsCount: 11
getAllServiceDefinitionsCount: 5
getAllSecurityGroupsCount: 3
getAllSecurityPoliciesCount: 0
getAllIPPoolsCount: 0
Total no of deployed services: 1
getAllServiceDeploymentsCount: 0

Distributed Firewall (DFW) Score (Max Score: 10)

The enablement of the DFW may be determined by accessing data via the DFW API. In one embodiment, the score is a Boolean value, where the score is zero points if DFW is not enabled and the score is ten points if DFW is enabled. In one example, enablement is determined based on whether there are any firewall rules configured on the system. This data includes the default firewall rules which can be excluded from the calculation. Enablement is determined if any of the following values are greater than zero, indicating that there are firewall rules configured in the SDN:

DFW Rule Count: 4
DFW Section Count: 3

In this case where the Rule count or the section count is >0, score is set to 10

Cross-VC Score (Max Score: 10)

The enablement of the Cross-VC may be determined by accessing data via the Cross-VC API. In one embodiment, the score is a Boolean value, where the score is zero points if Cross-VC is not enabled and the score is ten points if Cross-VC is enabled. In one embodiment, enabled for Cross-VC is determined based on whether the current SDN manager is in standalone mode and if replication mode is not in a transit state. If there is no secondary manager configured, Cross-VC is not enabled.

In some embodiments, the network profile score is comprised of the constituent feature scores. It should be appreciated that the constituent feature scores may be weighed relative to each other. In other words, one constituent feature score may be weighted differently than another constituent feature score within the aggregate network profile score. For example, for an SDN, the enablement a distributed firewall feature may be weighted more related to the load balancing feature. In such an example, the constituent feature score for the distributed firewall is multiplied by a weighing factor (e.g., 2×) during the aggregation of the constituent feature scores. It should be appreciated that any number of constituent feature scores can be weighed. For example, a network administrator may determine that a number of constituent feature scores are weighed relative to each other.

In some embodiments, a constituent feature score may be removed or ignored within an available feature set for a version of the SDN. For example, a network administrator may determine that a feature (e.g., IDFW) is not relevant to the particular configuration of the SDN. In such an example, including the constituent feature score for the IDFW would provide an inaccurate network profile score for the SDN. A network administrator may selectively remove such a feature from the available feature set, thereby not impacting the network profile score with the inclusion of a constituent feature score for a feature that would not be implemented. Such embodiments allow for network administrators to tailor a network profile score to their desired network configurations.

FIGS. 4A through 6C show example network profile scores for inclusion within an administrative dashboard of a network (e.g., an SDN). The examples of FIGS. 4A through 6C are based on a network profile score that ranges between zero (0) and one-hundred (100), where the score is calculated at a workload level based on enablement of features of an available feature set. The network profile scores for the examples of FIGS. 4A through 6C consider an available feature set having the following ten features:

1) Network Virtualization (NV)
2) Anti-virus (AV)
3) Distributed Firewall (DFW)
4) ID Firewall (IDFW)
5) Load Balancing (LB)
6) Virtual Private Networking (VPN)
7) Network Extensibility (NetX)
8) Endpoint Monitoring
9) Network Address Translation (NAT)
10) Multi-Site Virtualization For simplification, the examples of FIGS. 4A through 6C assume that each workload is represented by a cluster of hosts in a datacenter, and that each constituent feature score is equally weighted (ten points). Therefore, for each feature fully enabled for the workload, the network profile score increases by ten points. It should be appreciated that some constituent feature scores include a Boolean value, as the feature can only be fully enabled or disabled (e.g., universally enabled). Some features (e.g., DFW) can be proportionally enabled, thus a constituent feature score for these features can range from zero to ten points.

Figure 4A:
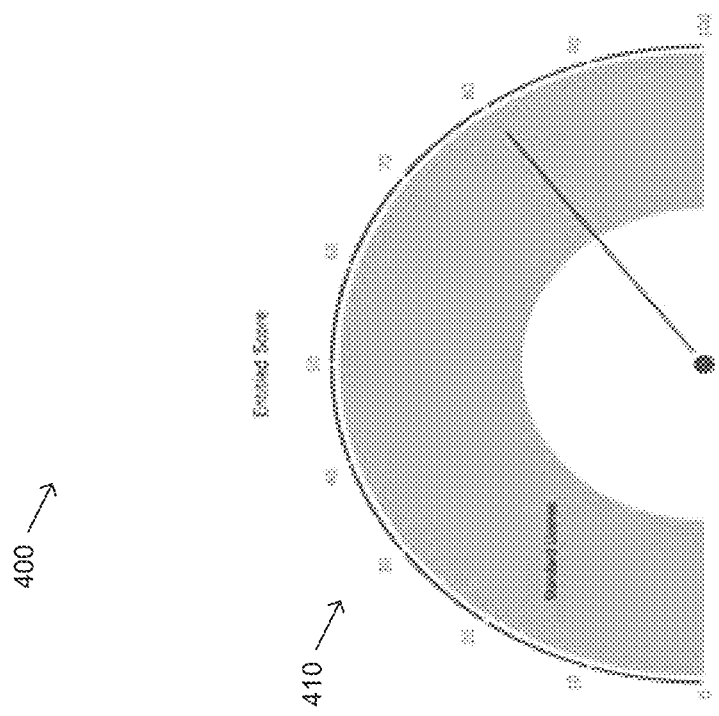
FIG. 4A shows example network profile scores in a micro-segmentation use case, in accordance with various embodiments.
Figure 4A:
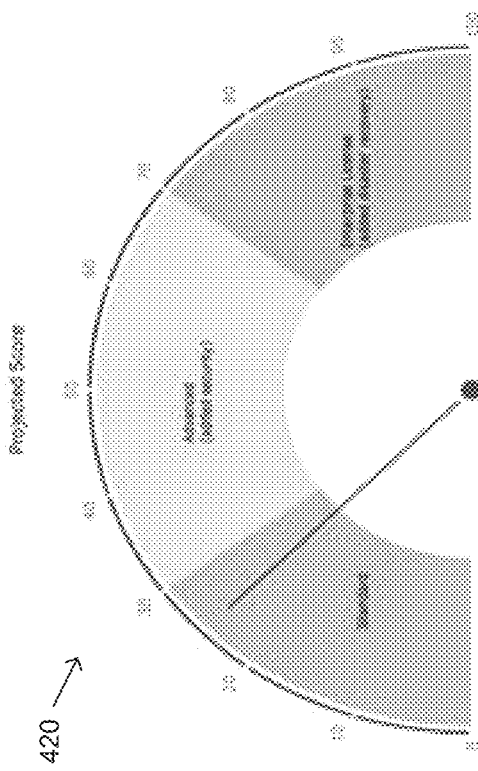

FIG. 4A shows example network profile scores 410 and 420 in a micro-segmentation use case, in accordance with various embodiments. In one embodiment, network profile scores 410 and 420 are provided within a dashboard component 400 of a dashboard for administrating a network (e.g., an SDN). Network profile scores 410 and 420 are provided via a graphical user interface, for presentation to a user (e.g., a network administrator). Network profile scores 410 and 420 are presented as values on graphical gauge display. However, it should be appreciated that network profile scores 410 and 420 can be presented using any type of graphical display.

In the illustrated example, network profile score 410 is an "entitled score," where an entitled score is based on an actual enablement of features of the available feature set relative to a current license version and network profile score 420 is a "projected score," where a projected score is based on an actual enablement of features of the available feature set relative to a different license version (e.g., a version having a larger available feature set).

FIG. 4A illustrates an example of network profile scores 410 and 420 in a micro-segmentation use case. In such an example, a network is operating a standard license having a feature set that includes fewer features than other licenses (an advanced license and an enterprise license). The advanced license includes additional security features relative to the standard license, and the enterprise license includes additional disaster recovery features relative to the standard license and the advanced license.

Figures 6A, 6B:
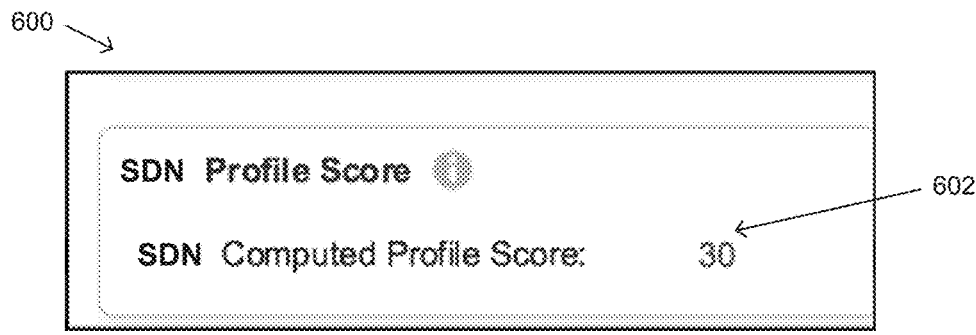
FIGS. 6A-C show an example graphical user interface including a network profile score and constituent feature scores, in accordance with various embodiments.
Figure 6C:
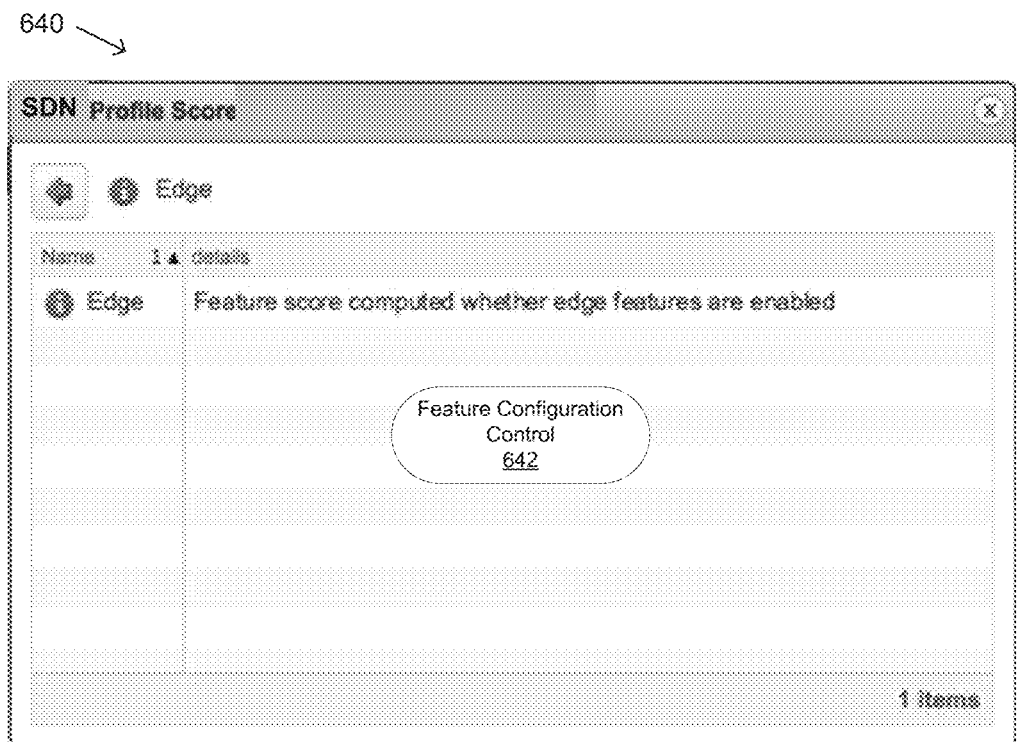

Network profile score 410 is eighty (80) points out of a possible one-hundred (100) points, thus indicating to a network administrator that some features of the available feature set of the standard license are not enabled. As illustrated in FIGS. 6A-C, the network administrator may drill down within network profile score 410 to analyze the constituent feature scores, for determining which features are not enabled.

Network profile score 420 is twenty-five (25) points out of a possible one-hundred (100) points, where the one-hundred (100) points is scaled to the enterprise license). Network profile score 420 indicates to a network administrator that enhanced security and disaster recovery features are available in the enterprise license version, which is available by upgrading. In essence, by projecting the network profile score to a higher license version, network profile score 420 informs a network administrator that the network could be improved, possibly significantly, by upgrading to a different license, thus providing additional available feature sets. In one embodiment, a recommendation to upgrade to a higher license version is also presented, allowing a network to leverage and utilize additional security features.

Figure 4B:
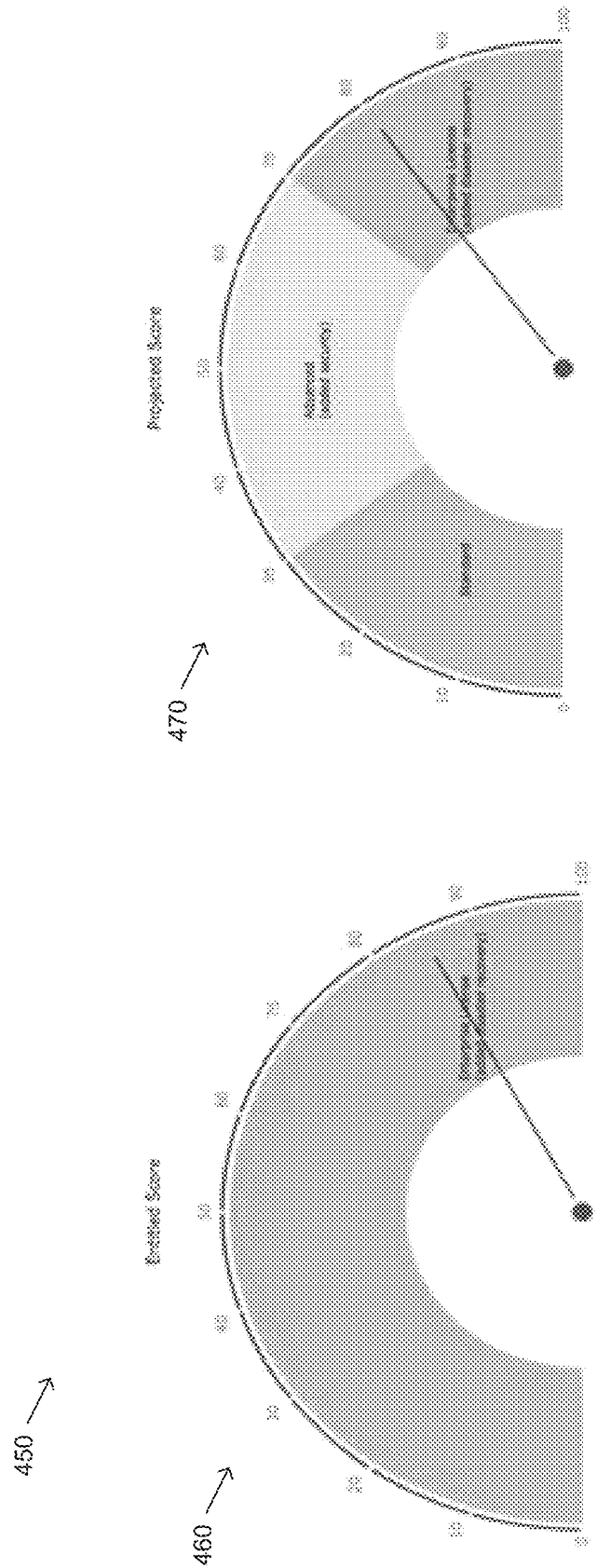
FIG. 4B shows example network profile scores in an application continuity use case, in accordance with various embodiments.

FIG. 4B shows example network profile scores 460 and 470 in an application continuity use case, in accordance with various embodiments. In one embodiment, network profile scores 460 and 470 are provided within a dashboard component 450 of a dashboard for administrating a network (e.g., an SDN). Network profile scores 460 and 470 are provided via a graphical user interface, for presentation to a user (e.g., a network administrator). Network profile scores 460 and 470 are presented as values on graphical gauge display. However, it should be appreciated that network profile scores 460 and 470 can be presented using any type of graphical display.

In the illustrated example, network profile score 460 is an "entitled score," where an entitled score is based on an actual enablement of features of the available feature set relative to a current license version and network profile score 470 is a "projected score," where a projected score is based on complete enablement of features of the available feature set relative to the highest license version. As illustrated, the network is implementing the enterprise version, which is the highest available version.

FIG. 4B illustrates an example of network profile scores 460 and 470 in an application continuity use case, where new features have been added to the available feature set. For example, a cross virtualization has been added to the available feature set for the enterprise version. In such an example, the network administrator may not be aware of the newly available feature. Thus, network profile scores 460 and 470 are used to communicate the newly available feature to the network administrator.

Network profile score 460 is eighty-five (85) points out of a possible one-hundred (100) points and network profile score 470 is eighty (80) points out of a possible one-hundred (100) points. Network profile score 470 is lower than network profile score 460, indicating to the network administrator that the enabled feature set is different than the available feature set, due to the addition of a new available feature since the calculation network profile score 460. As illustrated in FIGS. 6A-C, the network administrator may drill down within network profile scores 460 and 470 to analyze the constituent feature scores, for determining which features are not enabled.

In the current example, network profile score 470 is used to communicate the availability of a new feature for the current license version of the network. Communicating such information to relevant parties (e.g., network administrators) is notoriously difficult, and frequently relies on services that are easily missed or disregarded by such parties (e.g., emails, physical mail, etc.) Presenting information related to new features, aids in improving the performance of the network. In particular, where the new feature is security-related, communicating such information to a network administrator improves the security of the network, thereby improving the performance of the network.

Figure 5A:
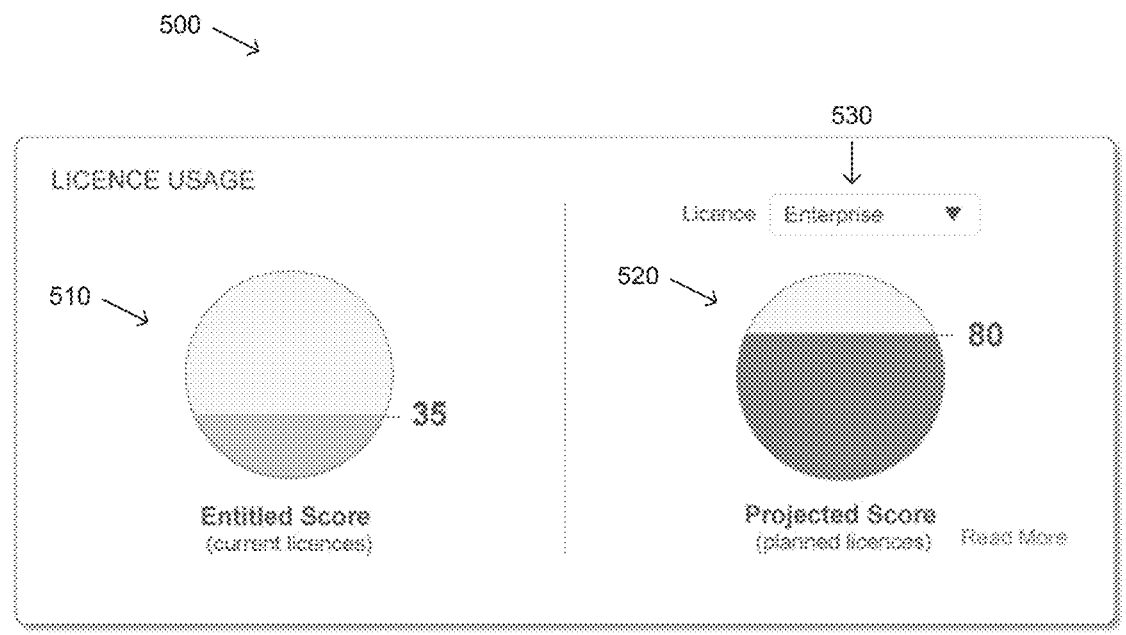
FIGS. 5A and 5B show example network profile scores as fill charts, in accordance with various embodiments.
Figure 5B:
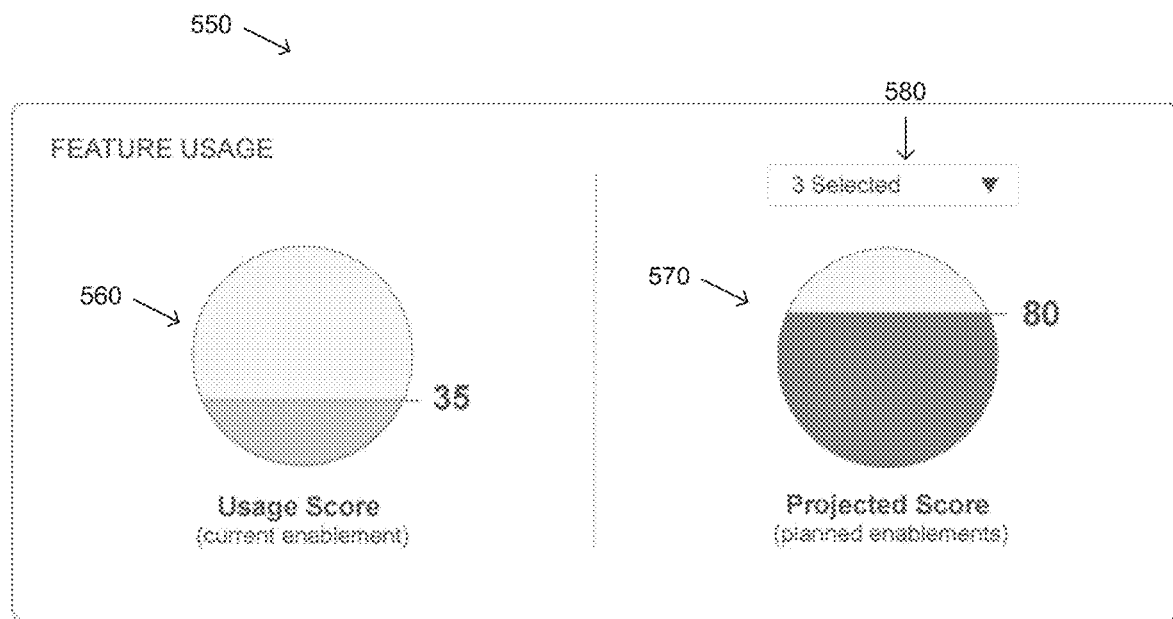

FIGS. 5A and 5B show example network profile scores as fill charts, in accordance with various embodiments. FIG. 5A shows example network profile scores 510 and 520 for illustrating license usage, in accordance with various embodiments. In one embodiment, network profile scores 510 and 520 are provided within a dashboard component 500 of a dashboard for administrating a network (e.g., an SDN). Network profile scores 510 and 520 are provided via a graphical user interface, for presentation to a user (e.g., a network administrator). Network profile scores 510 and 520 are presented as values visually represented on graphical fill chart displays. However, it should be appreciated that network profile scores 510 and 520 can be presented using any type of graphical display.

In the illustrated example, network profile score 510 is an "entitled score," where an entitled score is based on an actual enablement of features of the available feature set relative to a current license version and network profile score 520 is a "projected score," where a projected score is based on a planned enablement of features of an available feature set of a different license version. Drop-down menu 530 is available for selection of different license versions, such that network profile score 520 is based on the selected license version.

FIG. 5B shows example network profile scores 560 and 570 for illustrating feature usage, in accordance with various embodiments. In one embodiment, network profile scores 560 and 570 are provided within a dashboard component 550 of a dashboard for administrating a network (e.g., an SDN). Network profile scores 560 and 570 are provided via a graphical user interface, for presentation to a user (e.g., a network administrator). Network profile scores 560 and 570 are presented as values visually represented on graphical fill chart displays. However, it should be appreciated that network profile scores 560 and 570 can be presented using any type of graphical display.

In the illustrated example, network profile score 560 is a "usage score," where an usage score is based on an actual enablement of features of the available feature set relative to a current license version and network profile score 570 is a "projected score," where a projected score is based on an planned enablement of features of the available feature set relative of a selected different license version. Drop-down menu 580 is available for selection of different license versions, such that network profile score 570 is based on the selected license version.

As illustrated in FIGS. 6A-C, the network administrator may drill down within network profile scores 510 and 560 to analyze the constituent feature scores, for determining which features are not enabled.

FIGS. 6A-C show an example graphical user interface including a network profile score and constituent feature scores, in accordance with various embodiments. As illustrated in FIG. 6A, SDN profile score 602 is presented within graphical user interface window 600. SDN profile score 602 is selectable for user interaction (e.g., via a mouse or touchpad).

Responsive to a user interaction with SDN profile score 602, graphical user interface window 620 is presented, as illustrated in FIG. 6B. Graphical user interface window 620 includes a listing 622 of the constituent feature scores that are comprised within SDN profile score 602. Each constituent feature score has an associated selectable element 624 (e.g., "Details") that allows for user interaction for additional information and/or control of the associated feature.

Responsive to a user interaction with a selectable element 624, graphical user interface window 640 is presented, as illustrated in FIG. 6C. Graphical user interface window 640 is associated with the Edge Configuration feature, and provides additional description regarding the enablement of the edge feature. In one embodiment, graphical user interface window 640 also includes feature configuration control 642. In one embodiment, feature configuration control 642 allows for a user to enable and/or disable the associated feature within graphical user interface window 640. In another embodiment, feature configuration control 642 allows for a user to access a configuration control for the associated feature.

Network Reputation Service

In accordance with various described embodiments, a data center may operate to provide one or more managed networks (e.g., SDNs) for hosting VMs, workloads, etc. In some situations, a complex data center running user workloads with too many components installed may become a bottleneck for the administrator to do the administrative operations (e.g., bookkeeping) related to the performance and reliability/availability of the data center. In other situations, the introduction of new software may add to the complexity of monitoring the performance and behavior of the data center.

Embodiments described herein provide a reputation service for the software defined networking of a data center. The network reputation service provides a score computed based on vectors that determine the trust, availability and vulnerability of the network and the endpoints. For example, the network reputation service can be used to calculate the completeness of the network profile based at least in part on the feature set enabled by the user (e.g., using the network profile score).

For example, in one use case a network administrator has Service A and Service B installed and running on a data center. Service C adds security to the feature set, but is not installed. The reputation service calculates the overall score of the data center based on the services enabled and provides a feedback to the administrator as to how to improve the reputation score. In some embodiments, the reputation score is calculated in real-time based on the feedback from the endpoints/network. For example, when an endpoint reports an error, the reputation score is recalculated. The feedback mechanism helps the administrator to pinpoint the exact cause of error, allowing the administrator to more easily take corrective action, thereby improving the performance of the data center. In some embodiments, the feedback also provides a set of recommendations which the administrator can apply to increase/restore the reputation score.

The described embodiments apply a network reputation service to a network and/or a data center, to provide an administrator with increased ease the ability to check the correctness of a network. The reputation service is provided as a component of the SDN, thereby increasing the trust and legitimacy of such a service over third-party services, allowing additional trusted and legitimate information for the administrator to use in design and monitoring of overall network performance and infrastructure.

Embodiments herein provide a reputation service for the software defined networking of a datacenter. In one embodiment, with reference to FIG. 3, network reputation service 324 is implemented within managed network 320. The reputation service is operable to provide a reputation score computed based on vectors that determine the trust, availability and vulnerability of the network and the endpoints. Reputation Scores for various services in the SDN are calculated (e.g., at the transport zone). A transport zone is a set of transport nodes which spans across the SDN. Using the reputation score, trust, availability and vulnerability of the network/zone can be determined. In some embodiments, scores can be classified into various categories based on the SDN feature set.

Reputation scores may include multiple scores for different categories. In one embodiment, the reputation score includes a trust component, and availability component, and a vulnerability component.

TRUST—An indicator of the trustworthiness of a network (e.g., SDN) based on the enabled service of the network. For example, enabling services such as DFW and distributed network encryption (DNE) increases the trustworthiness of the network, thereby increasing the trust score.

AVAILABILITY—An indicator of the availability of the network. For example, the availability can be determined by the number of times a transport zone is reported to have drops in the network, logical ports were down or routes were missing.

VULNERABILITY—An indicator of how vulnerable the network is to attacks (e.g., network intrusions or Distributed Denial of Service (DDoS) attacks). For example, a network security scanner, such as Nmap, can scan at a guest to determine network security. Also, rogue processes running at the endpoint can be determined (e.g., using Guest introspection of NSX) to determine network vulnerability.

In various embodiments, a trust score of a network can be based on two vectors including scores that are calculated at the network and the endpoints. In one embodiment, the trust score includes the network profile score described above. The combined score can determine how secure/trustworthy a network is for the administrator. For example, a ranking of a service varies based on how stable the service is and whether or not the service has been enabled. The network with a high score can further be used as a blueprint for creating new networks. The following table illustrates example features that would be taken into consideration to calculate each score:

| Network Score | Endpoint Score |
|---|---|
| DFW | Antivirus Scans Enabled |
| DNE | Identity Firewall |
| NetX | Vulnerability Scans |

In various embodiments, an availability score (also referred to as a reliability score) of a network can be calculated based on the uptime of keys statistics for various services/components within a network. The score combines the monitoring of key statistics in a network, whether a particular component exceeds its capacity or whether a particular service is configured over its acceptable limits. The following table illustrates example features that would be taken into consideration to calculate each score:

| Network Score | Services Score | Fabric Score |
|---|---|---|
| Virtual machines | Firewall Rules configured per Logical port | Hosts exceeding % CPU % memory utilization |
| Logical Ports per logical Switch Logical Switches per logical Router | DNE Rules configured per Logical port | Hosts in transport Zone |

In various embodiments, a vulnerability score (also referred to as a risk score) of a network can be calculated based on the configuration of network services or the scans at the endpoint exposing the risk factors within a network. The risk score of a network determines the effectiveness of the various rules/endpoints in a network. The following table illustrates example features that would be taken into consideration to calculate each score:

| Network | Endpoint |
|---|---|
| DFW Rules | AV scan result |
| DNE Rules | Nmap scans |
| Edge LB configuration | NetX filter rules |

A reputation score, as well as the component scores that comprise the reputations score, can used as a basis for a network administrator to determine the overall health of a network. This enables an administrator to monitor a network continuously and provides the administrator with recommendations/policies to improve the overall network. Furthermore, an administrator can monitor the various scores continuously and raise necessary alarms based on the score changes to ensure compliance with a service level agreement (SLA) of the network. The following table illustrates example score calculations, score monitoring, and action recommendations for each component:

| Score calculation | Score Monitoring | Recommendations |
|---|---|---|
| TRUST | Feature set enabled/disabled | Enabling DFW/DNE/GI/VA feature set |
| AVAILABILITY/RELIABILITY | Hv getting DDoS attacks from VMs, capacity planning | Enabling Bandwidth Access, Show % exceeding capacity |
| VULNERABILITY/RISK | Periodic rogue apps access Nmap scans on the VMs | Firewall rules on high vulnerable apps (e.g., port 80 open guests) |

Example Methods of Operation

Figure 7A:
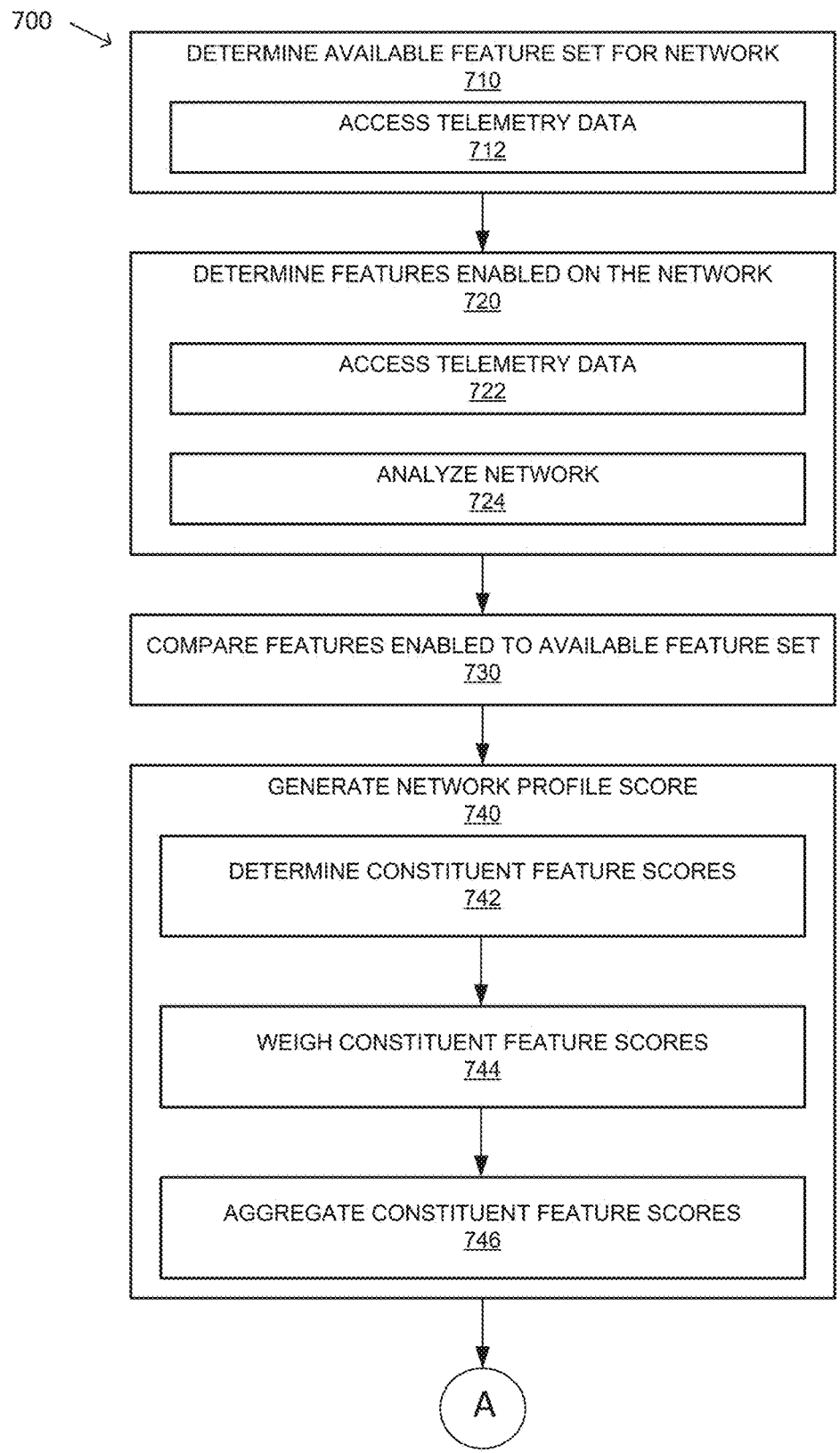
FIGS. 7A and 7B illustrate a flow diagram of a method for determining feature utilization in a software-defined network, according to various embodiments.
Figure 7B:
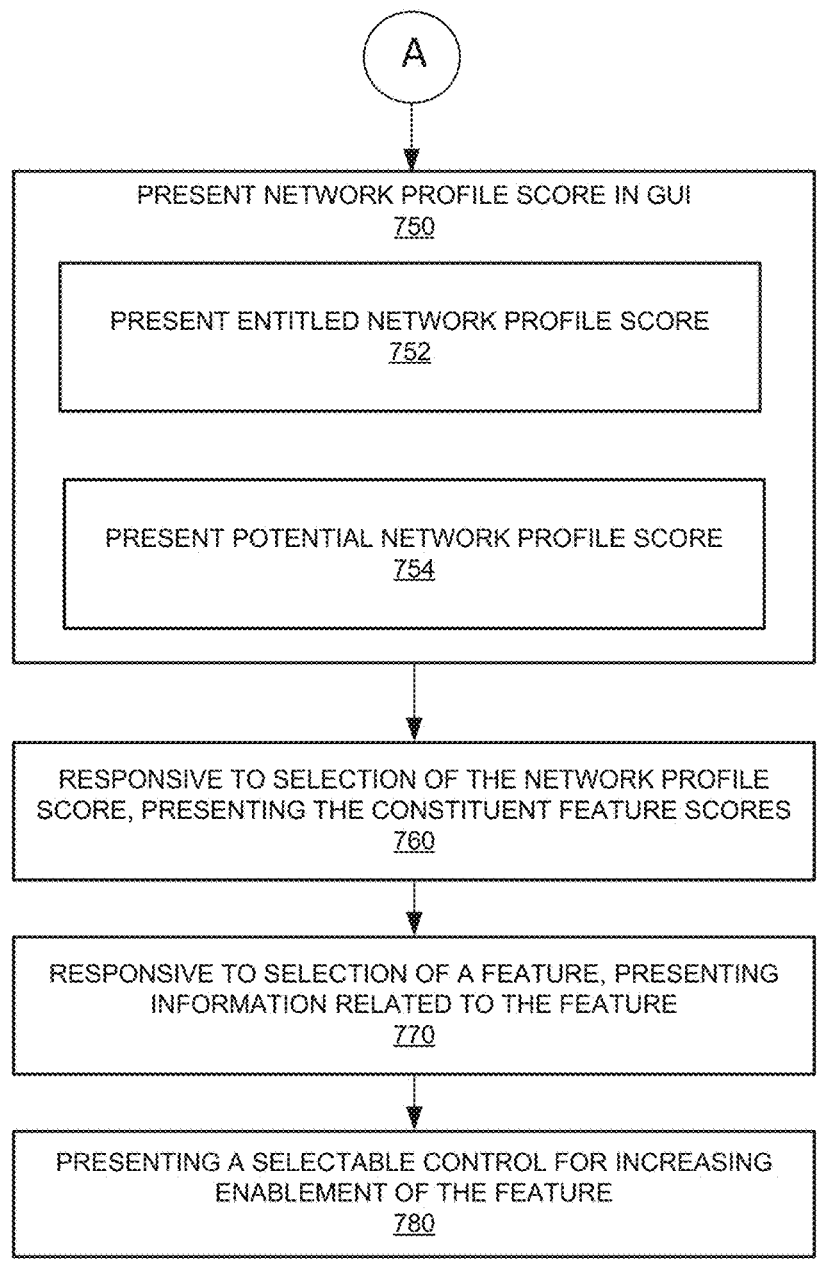

FIGS. 7A and 7B illustrate a flow diagram 700 of a method for determining feature utilization in a software-defined network, according to various embodiments. Procedures of this method will be described with reference to elements and/or components of FIGS. 3, 4, and 6A-C. It is appreciated that in some embodiments, the procedures may be performed in a different order than described, that some of the described procedures may not be performed, and/or that one or more additional procedures to those described may be performed. Flow diagram 700 includes some procedures that, in various embodiments, are carried out by one or more processors under the control of computer-readable and computer-executable instructions that are stored on non-transitory computer-readable storage media. It is further appreciated that one or more procedures described in flow diagram 700 may be implemented in hardware, or a combination of hardware with firmware and/or software. In one embodiment, flow diagram 700 is implemented within managed network 320 at network profile score generator 322.

With reference to FIG. 7A, at procedure 710 of flow diagram 700, in various embodiments, an available feature set for the software-defined network is determined, wherein the available feature set is based on a version of the software-defined network. In one embodiment, as shown at procedure 712, telemetry data is accessed for the software-defined network, wherein the telemetry data includes data identifying the version of the software-defined network. In one embodiment, the version is a license version of the software-defined network, wherein different license versions include different available feature sets. In one embodiment, an indication is received removing a feature from the available feature set, such that the available feature set does not comprise the feature. For example, if a network administrator determines that an available feature is not going to be enabled on the network, the feature can be removed from the available feature set for purposes of generating the network profile score.

At procedure 720, features enabled on the software-defined network are determined. In one embodiment, as shown at procedure 722, telemetry data is accessed for the software-defined network, wherein the telemetry data includes data identifying at least a portion of the features enabled on the software-defined network. In one embodiment, as shown at procedure 724, the software-defined network is analyzed to identify at least a portion of the features enabled on the software-defined network.

At procedure 730, the features enabled in the software-defined network are compared to the available feature set. At procedure 740, a network profile score is generated based on the comparing, wherein the network profile score includes constituent feature scores for features of the available feature set. In one embodiment, as shown at procedure 742, the constituent feature scores for the features of the available feature set are determined, wherein the constituent feature score represents a degree of enablement of the feature. In one embodiment, a constituent feature score of the constituent feature scores includes a Boolean value identifying whether a corresponding constituent feature is enabled. In one embodiment, a constituent feature score of the constituent feature scores includes a relative value identifying a degree to which corresponding constituent feature is enabled. In one embodiment, as shown at procedure 744, the constituent feature scores are weighed according to a relative weight value prior to the aggregating the constituent feature scores into the network profile score. In one embodiment, as shown at procedure 746, the constituent feature scores are aggregated into the network profile score.

With reference to FIG. 7B, at procedure 750, the network profile score (e.g., network profile score 602) is presented in a graphical user interface. The network profile score provides an indication of feature utilization of the available feature set. The graphical user interface allows for receiving a user interaction for presenting the constituent feature scores (e.g., constituent feature scores 622) for the features of the available feature set responsive to the user interaction. In one embodiment, as shown at procedure 752, an entitled network profile score (e.g., network profile score 410) based on an actual enablement of features of the available feature set is presented. In one embodiment, as shown at procedure 754, a potential network profile score (e.g., network profile score 420) based on an actual enablement of features of the available feature set for a different version of the software-defined network is presented.

In one embodiment, as shown at procedure 760, responsive to selection of the network profile score, the constituent feature scores (e.g., constituent feature scores 622) are presented. In one embodiment, as shown at procedure 770, responsive to selection of a feature corresponding to a constituent feature score at the graphical user interface, information related to the feature is presented (e.g., at graphical user interface window 640). In one embodiment, as shown at procedure 780, a selectable control (e.g., feature configuration control 642) for increasing enablement of the feature is presented. In one embodiment, the selectable control includes a control for enabling the feature. In one embodiment, the selectable control is operable to access a configuration control for controlling enablement of the feature.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A computer-implemented method for determining feature utilization in a software-defined network, the method comprising:
   determining an available feature set for the software-defined network, wherein the available feature set is based on a version of the software-defined network;
   determining features enabled on the software-defined network;
   comparing the features enabled in the software-defined network to the available feature set;
   generating a network profile score based on the comparing, wherein the network profile score comprises constituent feature scores for features of the available feature set, the network profile score representing a measure of a completeness of network configurations based upon the available feature set relative to the features enabled in the software-defined network;
   generating a projected score based on feature sets available by upgrading the software-defined network to a higher license version;
   presenting the network profile score and the projected feature score in a graphical user interface, wherein the graphical user interface allows for receiving a user interaction for presenting the constituent feature scores for the features of the available feature set responsive to the user interaction.

2. The method of claim 1, wherein the determining the available feature set for the software-defined network comprises:
   accessing telemetry data for the software-defined network, wherein the telemetry data comprises data identifying the version of the software-defined network.

3. The method of claim 1, wherein the version is a license version of the software-defined network, wherein different license versions comprises different available feature sets.

4. The method of claim 1, wherein the determining the features enabled on the software-defined network comprises:
   accessing telemetry data for the software-defined network, wherein the telemetry data comprises data identifying at least a portion of the features enabled on the software-defined network.

5. The method of claim 1, wherein the determining the features enabled on the software-defined network comprises:
   analyzing the software-defined network to identify at least a portion of the features enabled on the software-defined network.

6. The method of claim 1, wherein the generating the network profile score based on the comparing comprises:
   determining the constituent feature scores for the features of the available feature set, wherein the constituent feature score represents a degree of enablement of the feature; and
   aggregating the constituent feature scores into the network profile score.

7. The method of claim 6, further comprising:
   weighing the constituent feature scores according to a relative weight value prior to the aggregating the constituent feature scores into the network profile score.

8. The method of claim 6, wherein a constituent feature score of the constituent feature scores comprises a Boolean value identifying whether a corresponding constituent feature is enabled.

9. The method of claim 6, wherein a constituent feature score of the constituent feature scores comprises a relative value identifying a degree to which corresponding constituent feature is enabled.

10. The method of claim 1, further comprising:
    receiving an indication removing a feature from the available feature set, such that the available feature set does not comprise the feature.

11. The method of claim 1, wherein the presenting the network profile score in a graphical user interface comprises:
presenting an entitled network profile score based on an actual enablement of features of the available feature set.

12. The method of claim 1, wherein the presenting the network profile score in a graphical user interface comprises:
presenting a potential network profile score based on a complete enablement of features of the available feature set for a different version of the software-defined network.

13. The method of claim 1, further comprising:
responsive to receiving a selection of a feature corresponding to a constituent feature score at the graphical user interface, presenting information related to the feature; and
provided the constituent feature score is indicative of less than full enablement of the feature, presenting a selectable control for increasing enablement of the feature.

14. The method of claim 13, wherein the selectable control comprises a control for enabling the feature.

15. The method of claim 13, wherein the selectable control is operable to access a configuration control for controlling enablement of the feature.

16. In a computer system having a graphical user interface including a display device and a user interface selection device, a method for determining feature utilization in a software-defined network, the method comprising:
determining an available feature set for the software-defined network, wherein the available feature set is based on a version of the software-defined network;
determining features enabled on the software-defined network based at least in part on telemetry data for the software-defined network and on an analysis of the software-defined network;
comparing the features enabled in the software-defined network to the available feature set;
generating a network profile score based on the comparing, wherein the network profile score comprises constituent feature scores for features of the available feature set, the network profile score representing a measure of a completeness of network configurations based upon the available feature set relative to the features enabled in the software-defined network;
generating a projected score based on feature sets available by upgrading the software-defined network to a higher license version;
presenting the network profile score and the projected feature score in the graphical user interface;
responsive to a user interaction with the network profile score at the graphical user interface, presenting the constituent feature scores for the features of the available feature set responsive to the user interaction;
responsive to a second user interaction selecting a feature corresponding to a constituent feature score at the graphical user interface, presenting information related to the feature; and
provided the constituent feature score is indicative of less than full enablement of the feature, presenting a selectable control for increasing enablement of the feature.

17. The method of claim 16, wherein the presenting the network profile score in a graphical user interface comprises:
presenting an entitled network profile score based on an actual enablement of features of the available feature set.

18. The method of claim 16, wherein the presenting the network profile score in a graphical user interface comprises:
presenting a potential network profile score based on a complete enablement of features of the available feature set for a different version of the software-defined network.

19. The method of claim 16, further comprising:
responsive to a third user interaction with the selectable control, enabling the feature.

20. A computer system comprising:
a graphical user interface;
a display device;
a user interface selection device; and
one or more processors executing instructions that cause the one or more processors to at least:
determine an available feature set for a software-defined network, wherein the available feature set is based on a version of the software-defined network;
determine features enabled on the software-defined network based at least in part on telemetry data for the software-defined network and on an analysis of the software-defined network;
generate a network profile score based on comparing the features enabled in the software-defined network to the available feature set, wherein the network profile score comprises constituent feature scores for features of the available feature set, the network profile score representing a measure of a completeness of network configurations based upon the available feature set relative to the features enabled in the software-defined network;
generate a projected score based on feature sets available by upgrading the software-defined network to a higher license version;
present the network profile score and the projected feature score in the graphical user interface;
responsive to a user interaction with the network profile score at the graphical user interface, present the constituent feature scores for the features of the available feature set responsive to the user interaction;
responsive to a second user interaction selecting a feature corresponding to a constituent feature score at the graphical user interface, present information related to the feature; and
provided the constituent feature score is indicative of less than full enablement of the feature, present a selectable control for increasing enablement of the feature.

* * * * *